US011316745B2

(12) United States Patent
Harter

(10) Patent No.: US 11,316,745 B2
(45) Date of Patent: Apr. 26, 2022

(54) MODULAR COMMUNICATION SYSTEM

(71) Applicant: Charter Communications Operating, LLC, St. Louis, MO (US)

(72) Inventor: Ryan M. Harter, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 129 days.

(21) Appl. No.: 16/741,811

(22) Filed: Jan. 14, 2020

(65) Prior Publication Data
US 2021/0218634 A1 Jul. 15, 2021

(51) Int. Cl.
*H04L 12/24* (2006.01)
*H04L 41/12* (2022.01)
*H04L 12/66* (2006.01)
*H04L 45/74* (2022.01)

(52) U.S. Cl.
CPC .............. *H04L 41/12* (2013.01); *H04L 12/66* (2013.01); *H04L 45/74* (2013.01)

(58) Field of Classification Search
CPC .............. G06F 13/4004; G06F 13/404; H04L 12/4633; H04L 2212/00; H04L 25/0272; H04L 43/0811; H04L 45/60; H04L 45/74; H04L 61/6022; H04L 12/66; H04L 41/12
See application file for complete search history.

(56) References Cited

U.S. PATENT DOCUMENTS

| 5,649,001 | A  | * | 7/1997  | Thomas   | H04L 29/06 |
|           |    |   |         |          | 379/93.07  |
| 7,401,168 | B2 | * | 7/2008  | Moon     | G06F 13/385 |
|           |    |   |         |          | 710/38     |
| 8,594,104 | B2 | * | 11/2013 | Chowdhury | H04W 12/06 |
|           |    |   |         |          | 370/401    |
| 9,485,196 | B1 | * | 11/2016 | Sankaran | H04L 61/103 |
| 2004/0122985 | A1 | * | 6/2004  | Parra  | G06F 1/3287 |
|           |    |   |         |          | 710/1      |
| 2005/0074027 | A1 | * | 4/2005  | Natarajan | H04L 43/00 |
|           |    |   |         |          | 370/468    |

(Continued)

*Primary Examiner* — Shean Tokuta
(74) *Attorney, Agent, or Firm* — Armis IP Law, LLC

(57) ABSTRACT

A modular communication system includes gateway hardware and swappable versions of communication port hardware. Each different version of the swappable communication port hardware includes a first connector and corresponding one or more communication ports configured to provide connectivity to one or more communication devices. The gateway hardware includes a second connector selectively matable with the first connector. Coupling of the first connector and the second connector creates a communication link between the corresponding communication port hardware and the gateway hardware. A communication manager is disposed in the gateway hardware. When first (original) communication port hardware coupled to the gateway hardware is replaced with second communication port hardware, the communication manager discovers presence of the multiple communication ports associated with the second communication port hardware via communications through the communication link. The gateway hardware then and provides connectivity of the multiple ports to a remote network.

31 Claims, 10 Drawing Sheets

(56) References Cited

U.S. PATENT DOCUMENTS

| | | | | |
|---|---|---|---|---|
| 2007/0204069 A1* | 8/2007 | Bhesania | ............... | G06F 13/102 |
| | | | | 710/8 |
| 2008/0052442 A1* | 2/2008 | Matthews | ........... | H04L 43/0817 |
| | | | | 710/311 |
| 2011/0268443 A1* | 11/2011 | Adler | ................ | H04Q 11/0067 |
| | | | | 398/58 |
| 2012/0026018 A1* | 2/2012 | Lin | .................... | G06F 13/4068 |
| | | | | 341/26 |
| 2012/0057694 A1* | 3/2012 | Lee | .................... | H04L 25/0272 |
| | | | | 379/423 |
| 2012/0191880 A1* | 7/2012 | Gandhi | ................ | G06F 13/385 |
| | | | | 710/16 |
| 2013/0201316 A1* | 8/2013 | Binder | .................... | H04L 67/12 |
| | | | | 348/77 |
| 2014/0098713 A1* | 4/2014 | Beckhardt | ............... | H04L 45/16 |
| | | | | 370/256 |
| 2014/0256247 A1* | 9/2014 | Wietfeldt | .............. | H04W 76/10 |
| | | | | 455/39 |
| 2014/0313882 A1* | 10/2014 | Rucker | ................ | H04W 76/15 |
| | | | | 370/219 |
| 2015/0134803 A1* | 5/2015 | Li | ........................ | H04W 48/18 |
| | | | | 709/223 |
| 2015/0372656 A1* | 12/2015 | Mow | ...................... | H04B 17/29 |
| | | | | 455/77 |
| 2017/0302621 A1* | 10/2017 | Kinoshita | ................ | H01Q 1/42 |
| 2018/0246830 A1* | 8/2018 | Zhu | ...................... | G06F 13/364 |
| 2018/0278523 A1* | 9/2018 | Ong | ...................... | H04W 88/10 |
| 2018/0336159 A1* | 11/2018 | Kung | ...................... | G06F 13/4282 |
| 2019/0065422 A1* | 2/2019 | Sporck | ................ | G06F 13/385 |
| 2020/0393515 A1* | 12/2020 | Oshima | ..................... | H02J 3/38 |

\* cited by examiner

MODULAR COMMUNICATION SYSTEM

BACKGROUND

Typically, a subscriber domain (household) includes multiple different types of communication interfaces to support respective communications. For example, in certain instances, a physical communication link extends from a main communication link into a communications system resident in a subscriber domain.

The main communication system in the subscriber domain can support any of multiple different types of communications. For example, the main communication in the home can include multiple communication interfaces. Each communication interface provides a different communication service to the subscriber.

One type of communication interface is a wireless interface supporting WiFi™ connectivity. Other communication interfaces support in a subscriber domain typically support cable television, telephone signals, etc.

BRIEF DESCRIPTION OF EMBODIMENTS

This disclosure includes the observation that services and corresponding communication interfaces in a respective subscriber domain can change over time as a respective subscriber may add or eliminate certain communication services. This typically requires replacement of communication interface hardware to accommodate the changes, which can be substantial and costly since equipment is typically not reusable.

Embodiments herein include a modular communication system enabling simple reconfiguration to accommodate ever-changing consumer demands in a subscriber domain.

More specifically, in one embodiment, a modular communication system includes gateway hardware and swappable versions of communication port hardware. Each different version of the communication port hardware can include a same or different number types of communication ports.

In one embodiment, each version of the communication port hardware includes a first connector and corresponding one or more communication ports configured to provide connectivity to one or more communication devices such as in a subscriber domain. The gateway hardware (to which the communication port hardware connects) includes a second connector selectively matable with the first connector.

Coupling of the first connector and the second connector creates (completes) a communication link (connection) between the corresponding communication port hardware and the gateway hardware.

A communication manager is disposed in the gateway hardware. In one illustrative embodiment, when first (original) communication port hardware coupled to the gateway hardware is replaced with second communication port hardware, the gateway hardware detects a trigger event indicating the swapped communication port hardware. In response to the trigger event, the communication manager (in the gateway hardware) discovers presence of the multiple communication ports associated with the second communication port hardware via communications through the communication link. Subsequent to learning of the different communication interfaces associated with the newly connected communication port hardware, the gateway hardware then provides connectivity of the multiple (communication) ports associated with the newly inserted communication port hardware to a remote network.

In accordance with further embodiments, when providing connectivity of the multiple ports through the gateway hardware to the remote network, the communication manager receives communications from the remote network. Assume that the communications are directed to a first communication port of the multiple communication ports. In furtherance of communicating the communications to the first communication port, the communication manager encapsulates the received communications into encapsulated communications and forwards the encapsulated communications to the first communication port.

In one embodiment, the communication manager of the gateway hardware (gateway resource) implements L2 encapsulation of received messages. In such an instance, the communication manager (of the gateway hardware) encapsulates the received communications into encapsulated communications in accordance with L2 encapsulation prior to forwarding to the appropriate communication port of the communication port hardware.

In accordance with yet further example embodiments, the type of communication ports supported by the communication port hardware inserted into the gateway hardware may be unknown to the communication manager. Assume that the multiple communication ports of the newly inserted communication port hardware include a first communication port and a second communication port. Via first communications through the communication link with the first communication port, the communication manager in the gateway hardware (base hardware) detects a type assigned to the first communication port. Based on the type assigned to the first communication port, the communication manager identifies a first driver. Via execution of the first driver, the communication manager communicates with the first communication port. Via second communications through the communication link with the second communication port, the communication manager detects a type assigned to the second communication port. Based on the type assigned to the second communication port, the communication manager identifies a second driver. Via execution of the second driver by the communication manager, the communication manager communicates with the second communication port.

In yet further embodiments, the multiple communication ports of the communication port hardware include a first communication port. To support communications with the first communication port, the communication manager: i) detects a type assigned to the first communication port; ii) maps the type assigned to the first communication port to corresponding configuration information, the corresponding configuration information supporting operation of the first communication port; iii) retrieves the corresponding configuration information; and iv) utilizes the configuration information to communicate between the communication manager and the first communication port.

In one embodiment, as further discussed herein, the configuration information includes a respective driver that matches a type of communications associated with respective first communication port.

Further embodiments herein include, via the communication manager in the gateway hardware, in response to detecting a condition in which original communication port hardware connected to the gateway hardware is swapped with replacement communication port hardware (such as including different communication ports), initiating discovery of the multiple communication ports on the replacement communication port hardware via communications through the communication link.

Note that the communication port hardware can include any number of communication ports of any type. In one embodiment, the multiple communication ports include a first communication port and a second communication port. In one non-limiting example embodiment, the first communication port is a wireless transceiver supporting wireless communications; the second communication port supports communications over a hard-wired cable.

In yet further example embodiments, discovering presence of the multiple communication ports via communications from the communication manager over the communication link includes: in response to detecting initial connectivity of the communication port hardware into the gateway hardware, communicating a discovery inquiry (such as a probe request) over the communication link to the multiple communication ports; and in response to communication of the discovery inquiry, receiving a respective response communication from each of the corresponding communication ports, each respective response communication including a unique identifier value assigned to the corresponding communication port.

Yet further embodiments herein include, via the communication manager, providing connectivity of the multiple ports through the gateway hardware to the remote network. In one embodiment, this includes: based on the unique identifier value assigned to the corresponding communication port, instantiating a respective device driver for the corresponding communication port; and via the respective device driver, providing connectivity of the corresponding communication port over the communication link through the gateway hardware to the remote network. Providing of the connectivity of the corresponding communication port to the remote network can include, via the communication manager: i) receiving a communication from the remote network, the communication directed to the corresponding communication port; ii) executing the respective device driver to translate the received communication; and iii) forwarding the translated communication over the communication link to the corresponding communication port.

The modular communication system and reconfiguration as described herein is useful over conventional techniques as it provides a way to modify a communication system to provide different communication capabilities suitable for a respective subscriber domain. Automated discovery of the communication ports and subsequent setup and implementation of the communication ports enables the gateway hardware to support connectivity between each of the communication ports and a respective remote network.

These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment includes a computer readable storage medium and/or system having instructions stored thereon to facilitate communications. The instructions, when executed by computer processor hardware, cause the computer processor hardware (such as one or more co-located or disparately located processor devices) to: detect connectivity of communication port hardware to gateway hardware via a communication link provided by a connection of a first connector of the communication port hardware inserted into a second connector of the gateway hardware; via a communication manager disposed in the gateway hardware: i) discover presence of the multiple communication ports via communications over the communication link; and ii) provide connectivity of the multiple ports through the gateway hardware to a remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details

Figure 1:
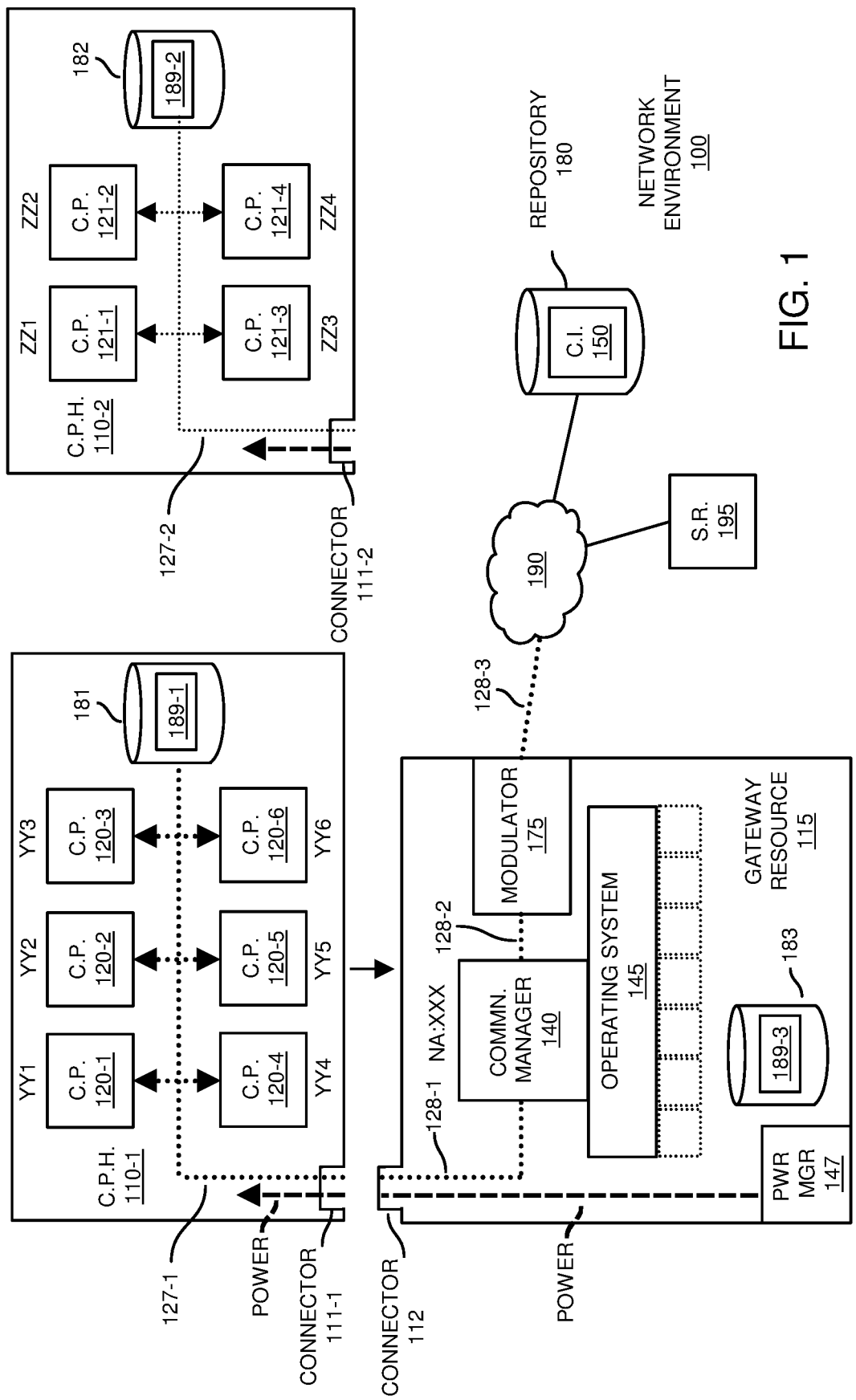
FIG. 1 is an example diagram illustrating components of a modular communication system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a modular communication system includes gateway hardware and swappable versions of communication port hardware. Each different version of the communication port hardware includes a first connector and corresponding one or more communication ports configured to provide connectivity to one or more communication devices. The gateway hardware includes a second connector selectively matable with the first connector of each of the different versions of the communication port hardware. Coupling of the first connector and the second connector creates (completes) a communication link between the corresponding communication port hardware and the gateway hardware.

A communication manager is disposed in the gateway hardware. When first (original) communication port hardware coupled to the gateway hardware is replaced with second communication port hardware, the communication manager discovers presence of the multiple communication ports associated with the second communication port hardware via communications through the communication link or detecting a unique identifier value associated with the communication port hardware. The gateway hardware then provides connectivity of the multiple ports to a remote network.

The modular communication system and reconfiguration via swappable communication port hardware as described herein is useful over conventional techniques as it provides a way to modify a communication system and provide different communication (port) capabilities suitable for changing needs of a respective subscriber domain or other environment. Automated discovery of the communication ports and/or specific type of communication port hardware after insertion of such a module into gateway hardware enables the gateway hardware to provide, after configuration, connectivity between each of the communication ports and a remote network.

Now, more specifically, FIG. 1 is an example diagram illustrating a modular communication system according to embodiments herein.

In this example embodiment, the modular communication system (such as network environment 100) in FIG. 1 includes gateway hardware (such as gateway resource 115) and swappable versions of communication port hardware 110. Each different version of the communication port hardware 110 includes a same or different number of communication ports, each of which are of the same or different type.

For example, communication port hardware 110-1 includes six communication ports 120-1, 120-2, 123, 120-4, 120-5, and 120-6; communication port hardware 110-2 includes four communication ports 121-1, 121-2, 121-3, and 121-4, and so on.

Note that a gateway resource 115 can be installed in a respective home environment (i.e., subscriber domain). A head-of-household of the subscriber domain is able to change a respective one or more subscription services via swapping of first communication port hardware 110-1 with communication port hardware 110-2 or vise-versa.

As a more specific example embodiment, as shown, network environment 100 includes network 190, gateway resource 115, and one or more different versions of communication port hardware 110 (such as communication port hardware 110-1, communication port hardware 110-2, etc.).

Network 190 can be configured to support different types of communications and data delivery services such as data packets (conveyed via a packet-switched network), phone communications, wireless communications, cable channels (such as linear television channels), video on demand communications, etc.

In one embodiment, each communication port supports a different type of communication. For example, communication port 120-1 can be configured to support wireless communications with one or more communication devices in network environment 100; communication port 120-2 can be configured to support wireless phone communications; communication port 120-3 can be configured to support hardwired network connectivity to one or more devices in a respective subscriber domain; communication port 120-4 can be configured to support wireless (Zigbee™) communication; and so on.

As further shown, the gateway resource 115 includes a power manager 147, operating system 145, communication manager 140, and modulator 175.

During operation, the power manager 147 provides power to the circuitry of gateway resource 115 as well as the corresponding communication port hardware when connected to the gateway resource 115.

Operating system 145 executes communication manager 140 facilitating conveyance of communications between the communication ports and the network 190 and vise-versa.

Further, as its name suggests, modulator 175 provides modulation/demodulation of respective signals received and transmitted over the communication link 128.

As previously discussed, the communication port hardware 110-1 includes communication port 120-1, communication port 120-2, communication port 120-3, communication port 120-4, communication port 120-5, and communication port 120-6. In one embodiment, each of the different communication ports is in communication with the communication link 127-1 (such as an address and data bus, serial communication link, etc.) extending from connector 111-1 to the communication ports 120.

In one embodiment, the communication link 127-1 is a shared communication link supporting communications with each of the communication ports 120. Alternatively, note that the communication link 127-1 can include independent communication paths between connector 111-1 in each of the corresponding communication ports 120.

Note that the communication port hardware 110-1, 110-2, etc., can include any number of communication ports of any respective type. In one embodiment, the communication port hardware 110-1 includes at least a first communication port and a second communication port. In one nonlimiting example embodiment, the first communication port 120-1 is a wireless transceiver supporting wireless communications with one or more mobile communication devices in the network environment; the second communication port 120-2 supports communications over a hard-wired cable to one or more communication devices in the network environment 100; and so on.

In yet further example embodiments, each of the communication ports and corresponding hardware/software is assigned a unique identifier value. For example, the communication port 120-1 is assigned unique identifier value YY1; communication port 120-2 is assigned unique identifier value YY2; communication port 120-3 is assigned unique identifier value YY3; communication port 120-4 is assigned unique identifier value YY4; communication port 120-5 is assigned unique identifier value YY5; and communication port 120-6 is assigned unique identifier value YY6.

As further shown, and as previously discussed, a second version of communication port hardware 110-2 includes a different number of ports such as including communication port 121-1, communication for 121-2, communication port 121-3, and communication port 121-4. Each of the different communication ports of the communication port hardware 110-2 is in communication with the communication link 127-2. For example, the communication link 127-2 extends from the connector 111-2 to each of the communication ports 120 of the communication port hardware 110-2.

In one embodiment, the communication link 127-2 is a shared communication link supporting communications with each of the communication ports 121. Alternatively, note that the communication link 127-2 can include independent communication paths between connector 111-2 in each of the corresponding communication ports 121.

Each of the communication ports in communication port hardware 110-2 is assigned a unique identifier value. For example, the communication port 121-1 is assigned unique identifier value ZZ1; communication port 121-2 is assigned unique identifier value ZZ2; communication port 121-3 is assigned unique identifier value ZZ3; communication port 121-4 is assigned unique identifier value ZZ4.

In one embodiment, the unique identifier values assigned to the respective communication ports are respective unique network addresses (such as MAC addresses, Internet Protocol addresses, etc.).

As further discussed below, the gateway resource 115 is configurable depending upon the different communications ports detected in communication port hardware.

Figure 2:
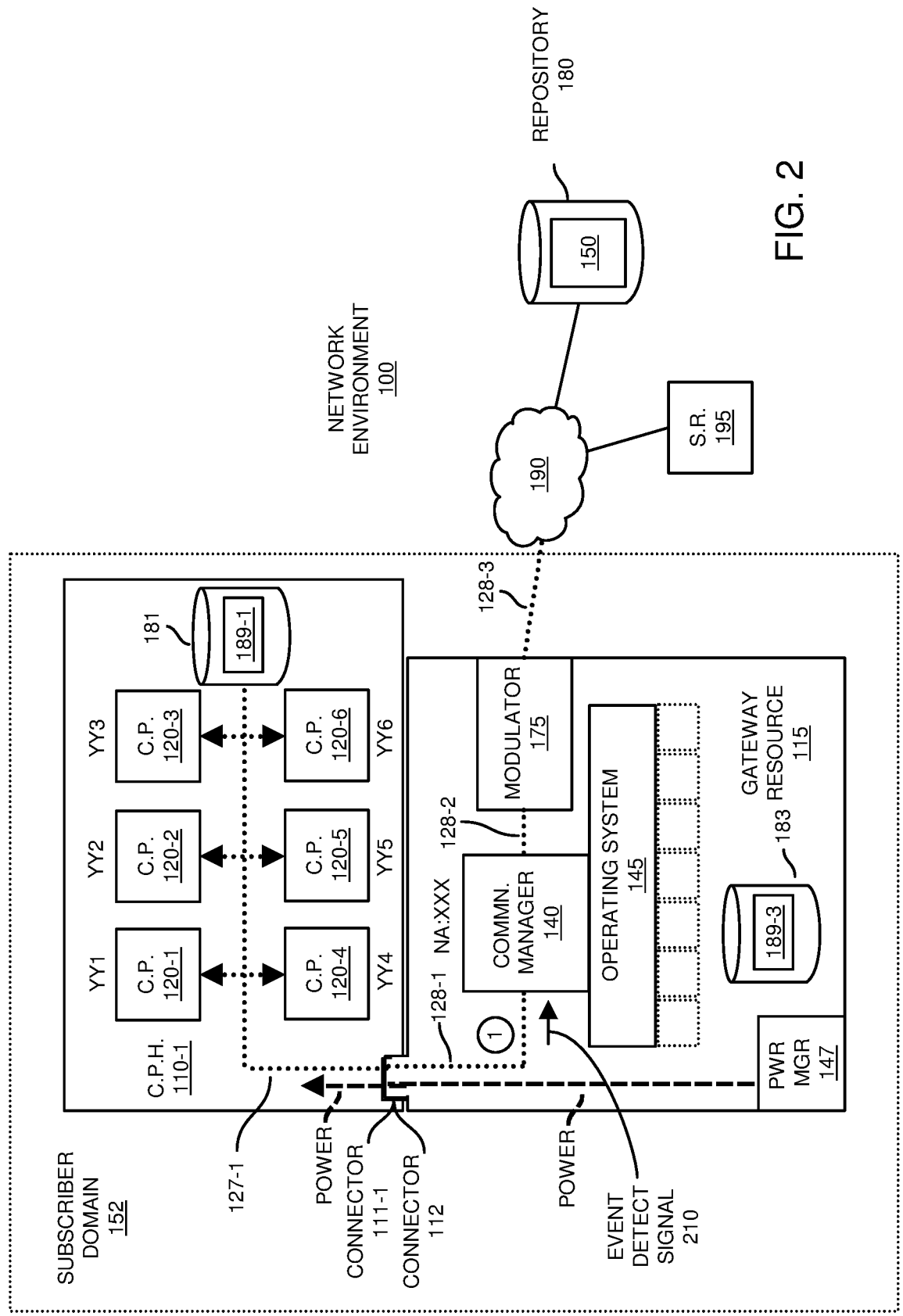
FIG. 2 is an example diagram illustrating insertion of first communication port hardware into a base gateway resource according to embodiments herein.

FIG. 2 is an example diagram illustrating first communication port hardware inserted into a base gateway resource according to embodiments herein.

As previously discussed, each version of the communication port hardware 110 includes a respective first connector (such as connector 111-1, connector 111-2, etc.) and corresponding one or more communication ports configured to provide connectivity to one or more communication devices in a respective subscriber domain.

As previously discussed, the gateway resource 115 (such as hardware to which the communication port hardware 110 connects) includes a second connector 112 selectively matable with the first connector 111-1 or 111-2. Coupling of the first connector 111-1 of the communication port hardware 110-1 to connector 112 of the gateway resource 115 creates a data link connection (connection formed via communication link 128-1 and 127-1) between the corresponding communication port hardware 110-1 and the gateway resource 115 (hardware and/or software).

In this example embodiment, the gateway resource 115 detects a trigger event signal 210 when the connector 111-1 of the communication port hardware 110-1 is connected to the connector 112 associated with the gateway resource 115. This can include detecting a connectivity of a circuit via connection of the connector 111-1 into the connector 112.

In response to detecting that the communication port hardware 110-1 is newly connected to the gateway resource 115 via connectivity of the connector 111-1 to the connector 112, the communication manager 140 executes a discovery algorithm as further discussed below. Via the discovery algorithm, the communication manager 140 discovers presence of the multiple communication ports associated with the communication port hardware 110-1 via communications through the communication link 128-1/127-1.

Detecting connectivity of the communication port hardware 110-1 to the gateway resource 115 can occur in any suitable manner.

For example, in one embodiment, the circuit board associated with the communication port hardware 110-1 can include a jumper or conductivity between 2 pins in the connector 111-1. When the connector 111-1 is inserted into the connector 112, the communication manager 140 receives an event detect signal 210 indicating that the communication port hardware 110-1 has been connected to the gateway resource 115.

Figure 3:
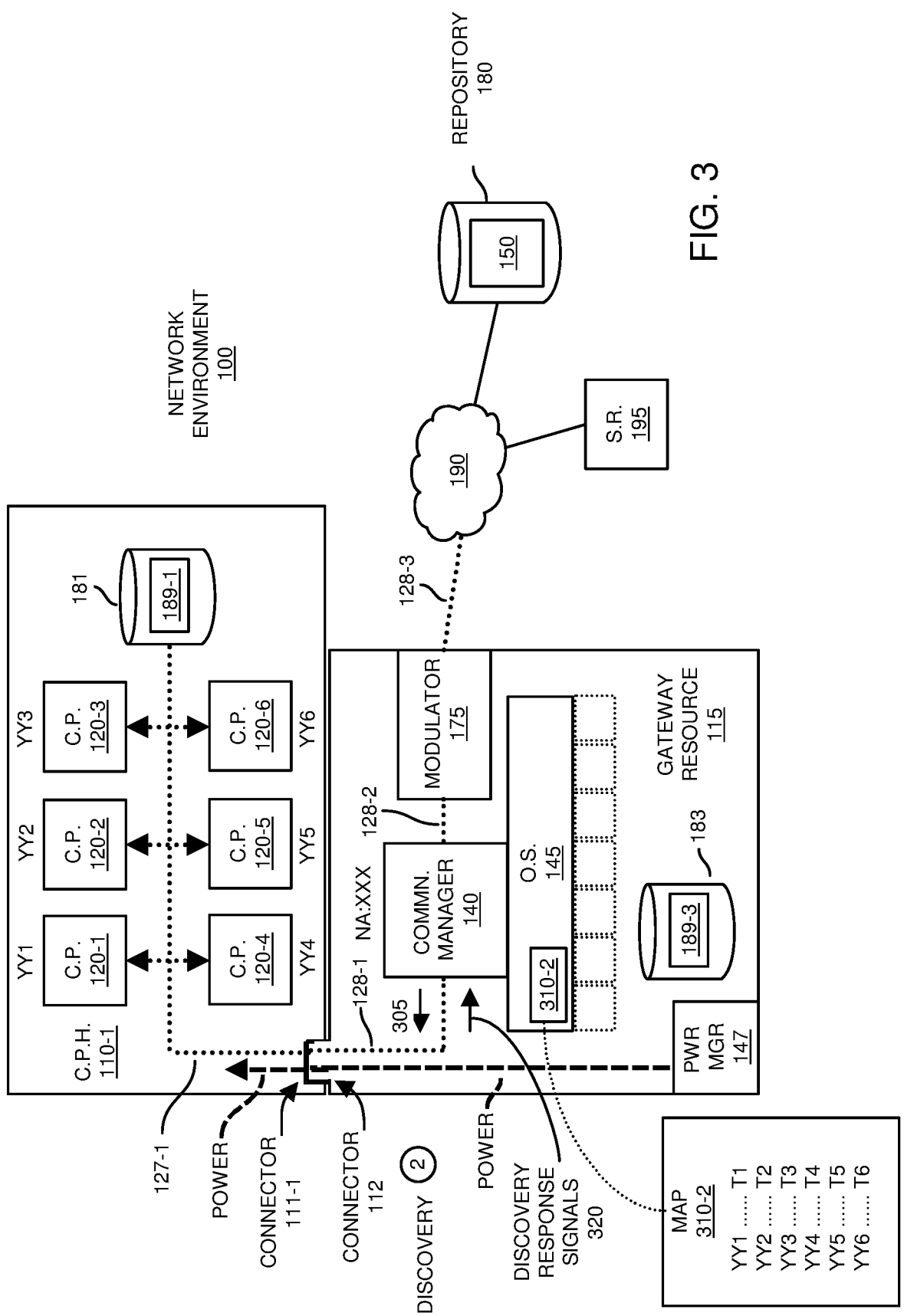
FIG. 3 is an example diagram illustrating discovery of communication ports in the inserted communication port hardware according to embodiments herein.
Figure 4:
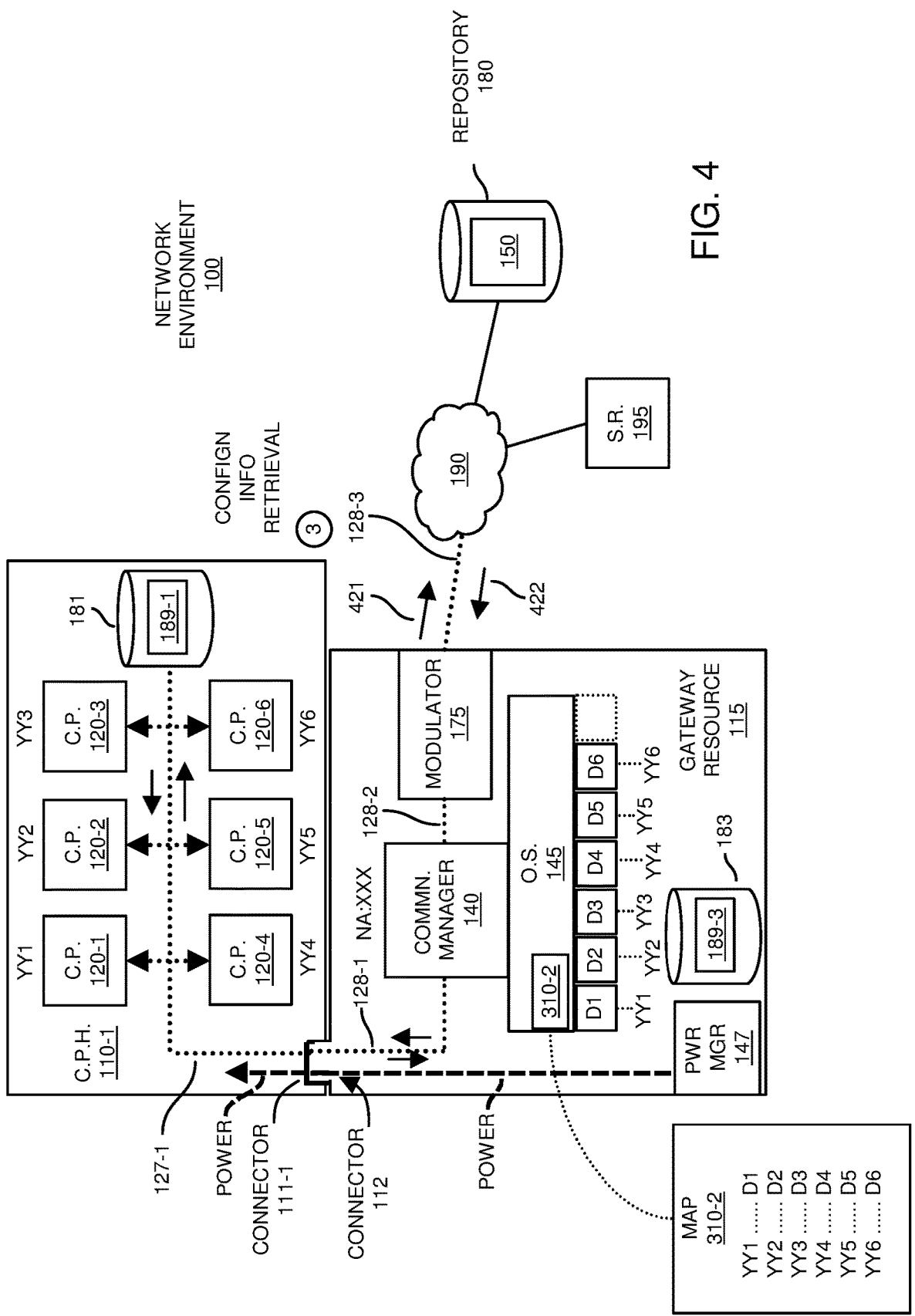
FIG. 4 is an example diagram illustrating retrieval of configuration information for each of multiple detected communication ports according to embodiments herein.

As further discussed below, subsequent to learning (via discovery) of the different communication interfaces associated with the newly connected communication port hardware in FIG. 3, the gateway resource 115 then provides connectivity of the multiple (communication) ports 120 associated with the newly inserted communication port hardware 110 to a remote network 190 as shown in FIG. 4. Via communications through the communication ports 120, the communication devices in subscriber domain 152 (in which the gateway resource 115 and communication port hardware 110-1) are able to transmit and receive data through the gateway resource 115 to network 190.

FIG. 3 is an example diagram illustrating discovery of communication ports associated with the inserted communication port hardware according to embodiments herein.

As shown in FIG. 3, the communication manager 140 transmits a discovery request message 305 over the communication link 128-1 and communication link 127-1 to each of the communication ports 120.

In one embodiment, the request message 305 includes a network address XXX (source) assigned to the communication manager 140. In this manner, each of the communication ports 120 know what address to respond with a discovery response message.

In response to receiving the discovery request message 305, the communication ports 120 respond with discovery response signals 320 targeted to network address XXX. For example, as a discovery response, the communication port 120-1 transmits a first discovery response message (including information such as unique identifier value YY1, communication port type information T1, etc.) over communication link 127-1 and communication link 128-1 to the communication manager 140; communication port 120-2 transmits a second discovery response message (including information such as unique identifier value YY2, communication port type information T2, etc.) over communication link 127-1 and communication link 128-1 to the communication manager 140; the communication port 120-3 transmits a third discovery response message (including information such as unique identifier value YY3, communication port type information T3, etc.) over communication link 127-1 and communication link 128-1 to the communication manager 140; communication port 120-4 transmits a fourth discovery response message (including information such as unique identifier value YY4, communication port type information T4, etc.) over communication link 127-1 and communication link 128-1 to the communication manager 140; the communication port 120-5 transmits a fifth discovery response message (including information such as unique identifier value YY5, communication port type information T5, etc.) over communication link 127-1 and communication link 128-1 to the communication manager 140; communication port 120-6 transmits a sixth discovery response message (including information such as unique identifier value YY6, communication port type information T6, etc.) over communication link 127-1 and communication link 128-1 to the communication manager 140, and so on.

Accordingly, via discovery, the communication manager 140 learns of attributes (network addresses, type, etc.) associated with each of the communication ports of newly inserted communication port hardware 110-1. Via the received information, the communication manager creates a map 310-1 indicating the different communication ports and types associated with the communication port hardware 110-1. Based on such information, the communication manager 140 knows a type of communication protocol, capability, etc., associated with each of the communication ports.

FIG. 4 is an example diagram illustrating retrieval of configuration information for each of multiple communication ports according to embodiments herein.

Subsequent to discovery as previously discussed, the communication manager 140 retrieves and implements respective configuration setting information associated with each of the different communication ports in order support communications with each of them.

For example, based on a detected type associated with each of the communication ports, the communication manager 140 initiates, via requests 421, retrieval of corresponding configuration setting information associated with each of the communication ports. In response to the requests 421, the communication manager 140 receives respective responses 422 including the requested configuration setting information (such as a driver or suitable information) associated with the corresponding communication ports.

More specifically, assume that the communication port 120-1 is detected as being of a first type T1 (such as a wireless access point supporting WiFi™ communications to first communication devices 251 in subscriber domain 152) during discovery. Assume that the communication manager 140 detects that configuration setting information D1 is needed to support communications associated with the communication port 120-1 of type T1. In such an instance, the communication manager 140 initiates retrieval of appropriate configuration setting information D1 for the communication port 120-1 of type T1. In one embodiment, this includes communicating over network 190 (or directly to a local repository in the gateway resource or other suitable resource) to retrieve configuration setting information D1 from repository 180; the configuration setting information D1 is a respective driver supporting processing of communications associated with respective first communication port 120-1. In addition to implementing or executing configuration setting information D1 associated with type T1 via operating system 145, the communication manager 140 updates the map 310-2 to indicate that configuration setting information D1 is to be used to process messages over communication link 128 having network address YY1 as a destination address or a source address.

Assume that the communication port 120-2 is detected as being of a second type T2 (such as a hard-wired Ethernet port) during discovery. Assume that the communication manager 140 detects that configuration setting information D2 is needed to support communications associated with the communication port 120-2 of type T2. In such an instance, the communication manager 140 initiates retrieval of appropriate configuration setting information D2 for the communication port 120-2 of type T2. In one embodiment, this includes communicating over network 190 to retrieve configuration setting information D2 from repository 180; the configuration setting information D2 is a respective driver supporting processing of communications associated with respective first communication port 120-2. In addition to implementing or executing configuration setting information D2 associated with type T2 via operating system 145, the communication manager 140 updates the map 310-2 to indicate that configuration setting information D2 is to be used to process messages over communication link 128 having network address YY2 as a destination address or a source address.

Assume that the communication port 120-3 is detected as being of a third type T3 (such as a hard-wired cable television port to a set top box) during discovery. Assume that the communication manager 140 detects that configuration setting information D3 is needed to support communications associated with the communication port 120-3 of type T3. In such an instance, the communication manager 140 initiates retrieval of appropriate configuration setting information D3 for the communication port 120-3 of type T3. In one embodiment, this includes communicating over network 190 to retrieve configuration setting information D3 from repository 180; the configuration setting information D3 is a respective driver supporting processing of communications associated with respective communication port 120-3. In addition to implementing or executing configuration setting information D3 associated with type T3 via operating system 145, the communication manager 140 updates the map 310-2 to indicate that configuration setting information D3 is to be used to process messages over communication link 128 having network address YY3 as a destination address or a source address.

In a similar manner, the communication manager 140 retrieves and executes configuration setting information associated with each of the different communication ports 120.

Note further that the configuration setting information can be located locally such as from repository 183 of the gateway resource 115 or from repository 181 of the communication port hardware 110-1. In such an instance, the communication manager 140 can be configured to retrieve the configuration setting information associated with the communication ports 120 from repository 181 or repository 183.

As a more specific example, assume that the communication port 120-1 is detected as being of a first type T1 (such as a wireless access point supporting WiFi™ communications to first communication devices 251 in subscriber domain 152) during discovery. Assume that the communication manager 140 detects that configuration setting information D1 is needed to support communications associated with the communication port 120-1 of type T1. In such an instance, the communication manager 140 initiates retrieval of appropriate configuration setting information D1 for the communication port 120-1 of type T1. In one embodiment, this includes communicating over communication links 128-1/127-1 to retrieve configuration setting information D1 from configuration setting information 189-1 stored in repository 181; the configuration setting information D1 is a respective driver supporting processing of communications associated with respective first communication port 120-1. In addition to implementing or executing configuration setting information D1 associated with type T1 via operating system 145, the communication manager 140 updates the map 310-2 to indicate that configuration setting information D1 is to be used to process messages over communication link 128 having network address YY1 as a destination address or a source address.

Assume that the communication port 120-2 is detected as being of a second type T2 (such as a hard-wired Ethernet port) during discovery. Assume that the communication manager 140 detects that configuration setting information D2 is needed to support communications associated with the communication port 120-2 of type T2. In such an instance, the communication manager 140 initiates retrieval of appropriate configuration setting information D2 for the communication port 120-2 of type T2. In one embodiment, this includes communicating over communication links 128-1/127-1 to retrieve configuration setting information D2 from configuration setting information 189-1 stored in repository 180; the configuration setting information D2 is a respective driver supporting processing of communications associated with respective first communication port 120-2. In addition to implementing or executing configuration setting information D2 associated with type T2 via operating system 145, the communication manager 140 updates the map 310-2 to indicate that configuration setting information D2 is to be used to process messages over communication link 128 having network address YY2 as a destination address or a source address.

Assume that the communication port 120-3 is detected as being of a third type T3 (such as a hard-wired cable television port to a set top box) during discovery. Assume that the communication manager 140 detects that configuration setting information D3 is needed to support communications associated with the communication port 120-3 of type T3. In such an instance, the communication manager 140 initiates retrieval of appropriate configuration setting information D3 for the communication port 120-3 of type T3. In one embodiment, this includes communicating over communication links 128-1/127-1 to retrieve configuration setting information D3 from repository 180; the configuration setting information D3 is a respective driver supporting processing of communications associated with respective communication port 120-3. In addition to implementing or executing configuration setting information D3 associated with type T3 via operating system 145, the communication manager 140 updates the map 310-2 to indicate that configuration setting information D3 is to be used to process messages over communication link 128 having network address YY3 as a destination address or a source address.

In yet further example embodiments, as an alternative to retrieving the drivers D1, D2, D3, etc. from the repository 181 or the repository 180, embodiments herein include retrieving such drivers from configuration setting information 189-3. Accordingly, embodiments herein can include retrieving the drivers from any of a number of different resources.

Figure 5:
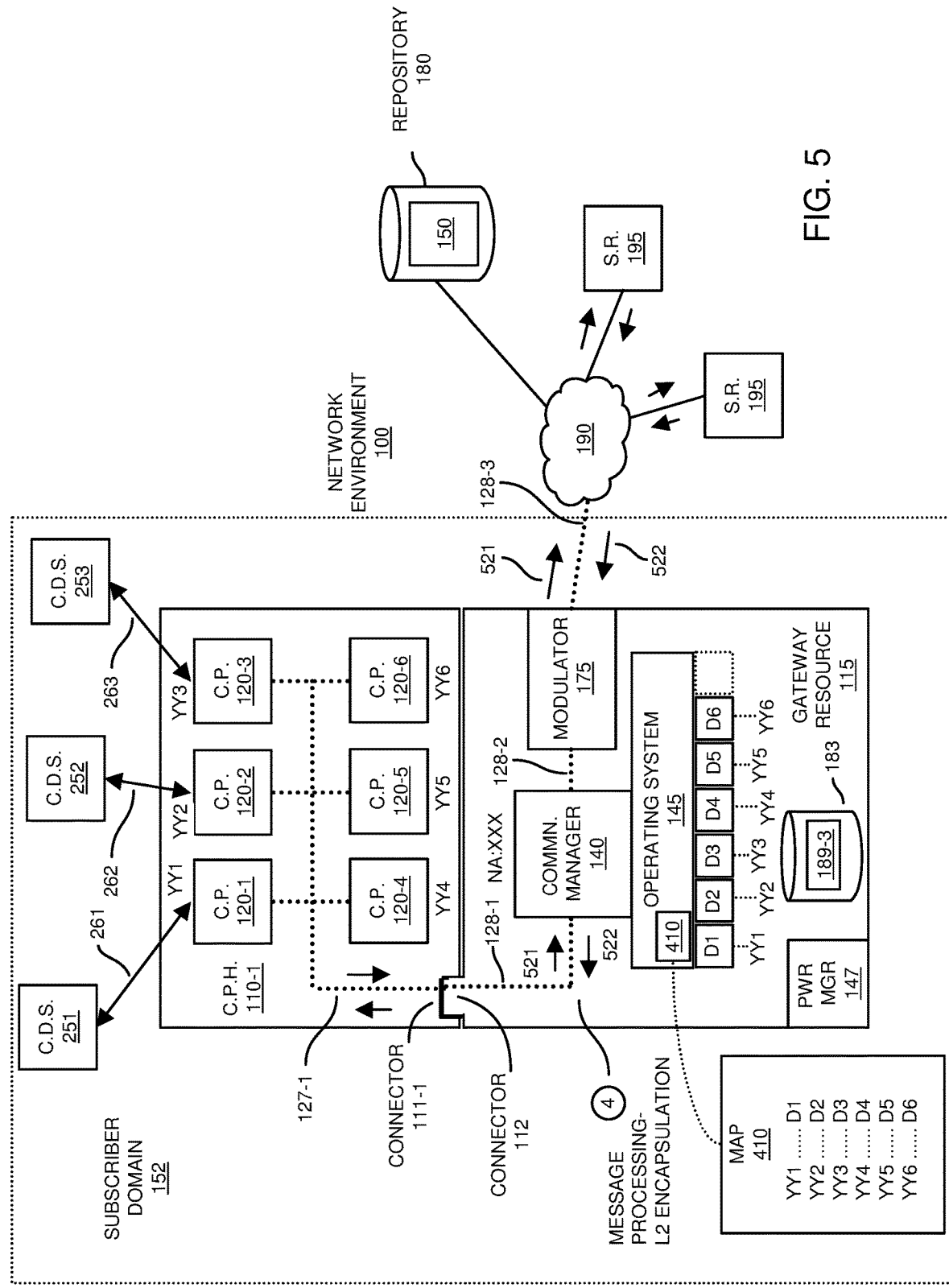
FIG. 5 is an example diagram illustrating conveyance of communications between the multiple communication ports and destination devices in a remote network according to embodiments herein.

FIG. 5 is an example diagram illustrating conveyance of communications between the multiple communication ports and destination devices in a remote network according to embodiments herein.

In accordance with further embodiments, when providing connectivity of the multiple communication ports 120 through the gateway resource 115 to the remote network 190, the communication manager 140 receives communications from the communication ports and forwards such communications over the network to the appropriate destination.

For example, assume that the communication manager 140 receives communications 521 from communication port 120-1 (source network address=YY1) of the multiple communication ports. In furtherance of communicating the received communications 521 to a target destination in network 190, the communication manager 140 processes the received communications 521 (such as based on configuration setting information D1 associated with communication port 120-1 and source address YY1) and forwards the encapsulated communications from the communication manager 140 over communication link 128-2/modulator 175/128-3 to the specified target entity in network 190. In one embodiment, the communication manager 140 maps a network address YY1 in the communications to configuration setting information D1 for corresponding processing (such as translation or other suitable function) of communications 521 prior to forwarding.

Assume that the communication manager 140 receives communications 521 from communication port 120-2 (source network address=YY2) of the multiple communication ports. In furtherance of communicating the received communications 521 to a target destination in network 190, the communication manager 140 processes the received communications 521 (such as based on configuration setting information D2 associated with communication port 120-1 and source address YY1) and forwards the encapsulated communications from the communication manager 140 over communication link 128-2/modulator 175/128-3 to the specified target entity in network 190. In one embodiment, the communication manager 140 maps a network address YY2 in the communications to configuration setting information D2 for corresponding processing (such as translation or other suitable function) of communications 521 prior to forwarding.

In this manner, the communication manager 140 process outbound communications from the communication port hardware 110-1 to network 190.

In accordance with yet further embodiments, when providing connectivity of the multiple communication ports 120 through the gateway resource 115 to the remote network 190, the communication manager 140 receives communications from the remote network 190 for delivery to the communication ports.

For example, assume that the communication manager 140 receives communications 522 from network 190 directed (targeted for delivery) to communication port 120-1 of the multiple communication ports. In furtherance of communicating the received communications 522 (destination address=YY1) to the communication port 120-1, the communication manager 140 applies processing (such as translation) to the received communications 521. In one embodiment, the communication manager 140 encapsulates the received communications 522 into encapsulated communications (such as based on L2 encapsulation) and forwards the encapsulated communications from the communication manager 140 over communication link 128-1/127-1 to the first communication port 120-1.

Assume that the communication manager 140 receives communications 522 from network 190 directed to communication port 120-2 of the multiple communication ports. In furtherance of communicating the received communications 522 (destination address=YY2) to the communication port 120-2, the communication manager 140 applies processing (such as translation) to the received communications 522. In one embodiment, the communication manager 140 encapsulates the received communications 522 into encapsulated communications (such as based on L2 encapsulation) and forwards the encapsulated communications from the communication manager 140 over communication link 128-1/127-1 to the first communication port 120-1.

In this manner, the communication manager 140 process inbound communications from network 190 to the communication port hardware 110-1.

Thus, to support communications, the communication manager 140: i) detects a type assigned to the first communication port 120-1 during discovery; ii) based on the detected type, creates a map 310-2 mapping the and communication port 120-1 to corresponding configuration information D1, the corresponding configuration information supporting processing of communications associated with the communication port 120-1; iii) executes or implements the corresponding configuration information D1 (such as a driver) associated with the communication port 120-1; and iv) utilizes the configuration information D1 to support communications between the communication manager 140 and the communication port 120-1.

To support communications, the communication manager 140: i) detects a type assigned to the second communication port 120-2 during discovery; ii) based on the detected type, creates a map mapping the and communication port 120-1 to corresponding configuration information D2, the corresponding configuration information supporting processing of communications associated with the communication port 120-2; iii) executes or implements the corresponding configuration information D2 (such as a driver) associated with the communication port 120-1; and iv) utilizes the executed configuration information D2 to support communications between the communication manager 140 and the communication port 120-1.

To support communications, the communication manager 140: i) detects a type assigned to the second communication port 120-3 during discovery; ii) based on the detected type, creates a map mapping the and communication port 120-3 to corresponding configuration information D3, the corresponding configuration information supporting processing of communications associated with the communication port 120-3; iii) executes or implements the corresponding configuration information D3 (such as a driver) associated with the communication port 120-3; and iv) utilizes the executed configuration information D3 to support communications between the communication manager 140 and the communication port 120-3, and so on.

Figure 6:
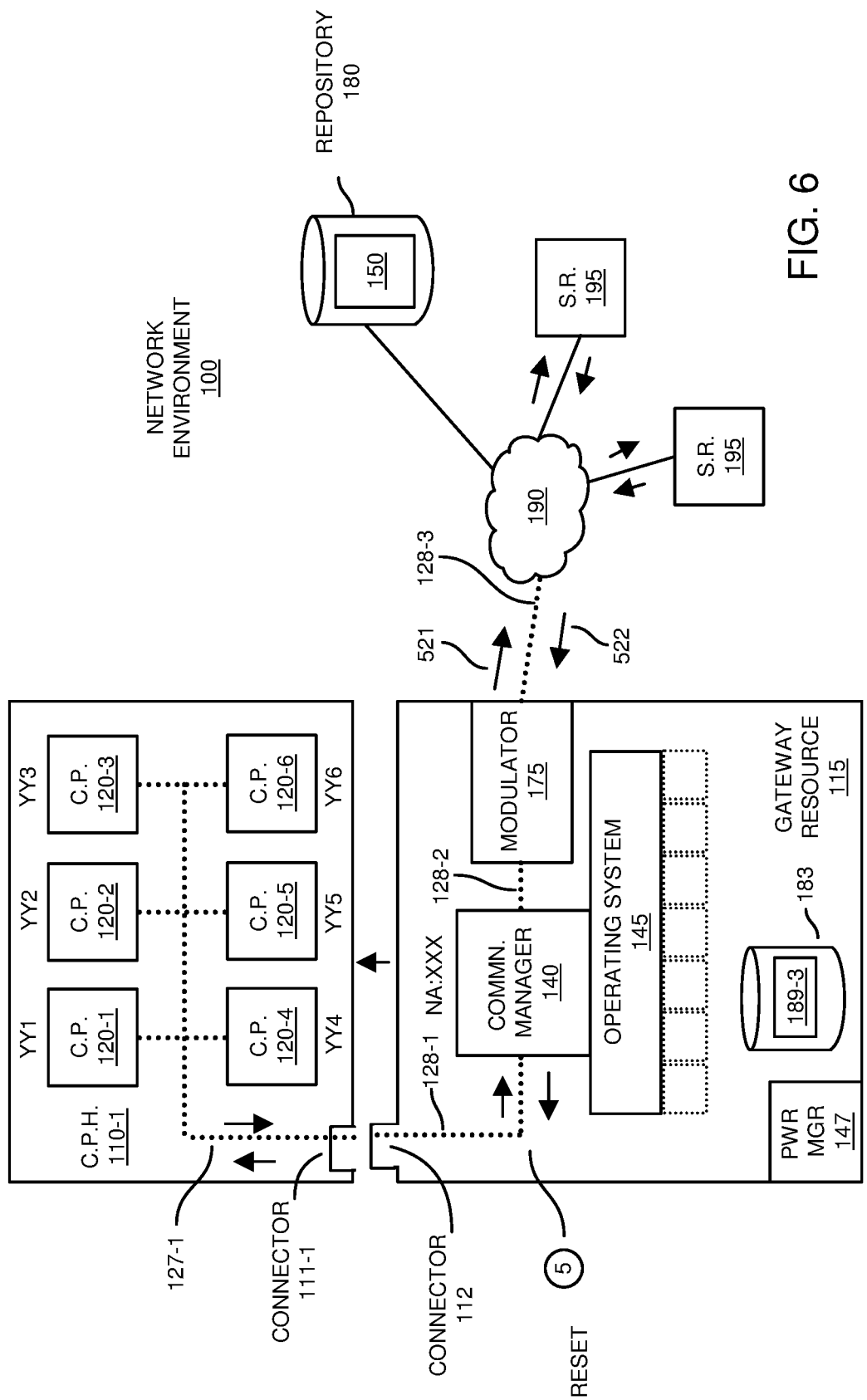
FIG. 6 is an example diagram illustrating removal of communication port hardware and re-setting of configuration information associated with the base gateway hardware (gateway resource) according to embodiments herein.

FIG. 6 is an example diagram illustrating removal of communication port hardware and initializing of the base gateway hardware and corresponding settings according to embodiments herein.

In this example embodiment, assume that the communication manager 140 receives a trigger event (signal) indicating that the communication port hardware 110-1 has been removed and/or replaced with different communication port hardware. This can include detecting an open circuit condition associated with pins of the connector 112 resulting from disengagement of the connector 111-1 from the connector 112.

In such an instance, the communication manager 140 resets (such as deletes or erases) the map 410 and respective configuration setting information D1, D2, D3, D4, D5, and D6 associated with the gateway resource 115 because they are no longer needed.

In one embodiment, the gateway resource 115 supports so-called hot-swap replacement of the communication port hardware 110-1 with the communication port hardware 110-2. As further discussed below, subsequent to swapping communication port hardware 110-1 with communication port hardware 110-2 as further discussed below, the communication manager 140 performs the discovery algorithm again to determine what communication ports are present on the communication port hardware 110-2.

Figure 7:
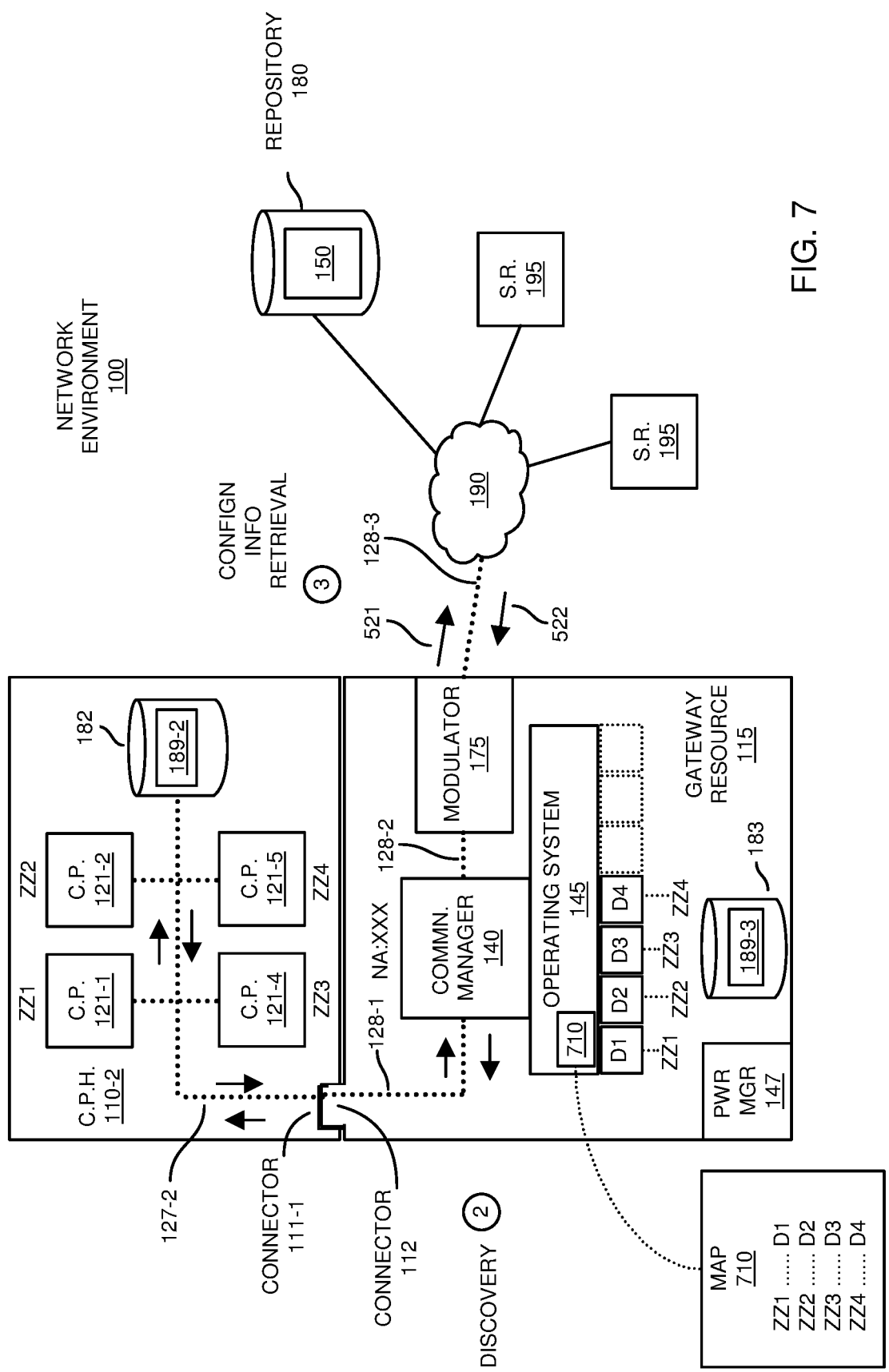
FIG. 7 is an example diagram illustrating discovery and retrieval of configuration information for each of multiple communication ports of newly inserted communication port hardware according to embodiments herein.

FIG. 7 is an example diagram illustrating discovery and retrieval of configuration information for each of multiple communication ports of the second communication port hardware according to embodiments herein.

In response to detecting a condition in which original communication port hardware 120-1 connected to the gateway resource 115 is swapped with replacement communication port hardware 120-2, in a similar manner as previously discussed, the communication manager 140 initiates discovery of the multiple communication ports 121-1, 121-2, 121-3, and 121-4 on the replacement communication port hardware 120-2 via communications through the communication link 128-1/127-2.

In this instance, via implementation of a discovery algorithm via the communication manager 140, the communication manager 140 discovers presence of communication ports 121-1, 121-2, 121-3, and 121-4. For example, the communication manager 140 can be configured to generate a discovery request to each of the communication ports. In response to receiving the discovery request, each of the communication ports responds with a reply message including its respective assigned network address. In such an instance, the communication manager 140 receives a reply message including network address ZZ1 from the communication port 121-1; the communication manager 140 receives a reply message including network address ZZ2 from the communication port 121-2; the communication manager 140 receives a reply message including network address ZZ3 from the communication port 121-3; the communication manager 140 receives a reply message including network address ZZ4 from the communication port 121-4.

In addition to receiving network address information from each communication port, the communication manager 140 receives information indicating a type associated with the respective communication port. For example, assume that the communication port 121 indicates that it is a wireless access point supporting wireless communications. In such an instance, the communication port 120-1 conveys type configuration information to the communication manager 140. In response to receiving the type configuration information associated with the communication port 120-1, the communication manager 140 initiates retrieval of appropriate configuration setting information such as one or more drivers or other configuration setting information associated with communication port 120-1 from repository 180 and stores it in the gateway resource 115.

Alternatively, in a manner as previously discussed, embodiments herein include retrieving such drivers D1, D2, D3, etc., from configuration setting information 189-2 in repository 182 via communications over communication links 128-1/127-2. Embodiments herein also include optionally retrieving such drivers D1, D2, D3, etc., from locally stored configuration setting information 189-3 stores in repository 183. Accordingly, embodiments herein can include retrieving the drivers from any of a number of different resources.

Via the learned network address information and retrieved configuration setting information (such as one or more driver) associated with each communication port, the communication manager 140 instantiates the newly retrieved drivers (such as D1, D2, D3, and D4) via operating system 145. Additionally, the gateway resource 140 creates map 710 mapping a respective network address of a communication port to respective configuration information.

For example, in this example embodiment, map 710 indicates that network address ZZ1 maps to configuration settings D1; map 710 indicates that network address ZZ2 maps to configuration settings D2; map 710 indicates that network address ZZ3 maps to configuration settings D3; map 710 indicates that network address ZZ4 maps to configuration settings D4.

In a similar manner as previously discussed, the communication manager 140 executed by the operating system 145 uses the map and corresponding configuration setting information D1, D2, D3, and D4 to process communications associated with the different communication ports 121 of the communication port hardware 110-2.

Figure 8:
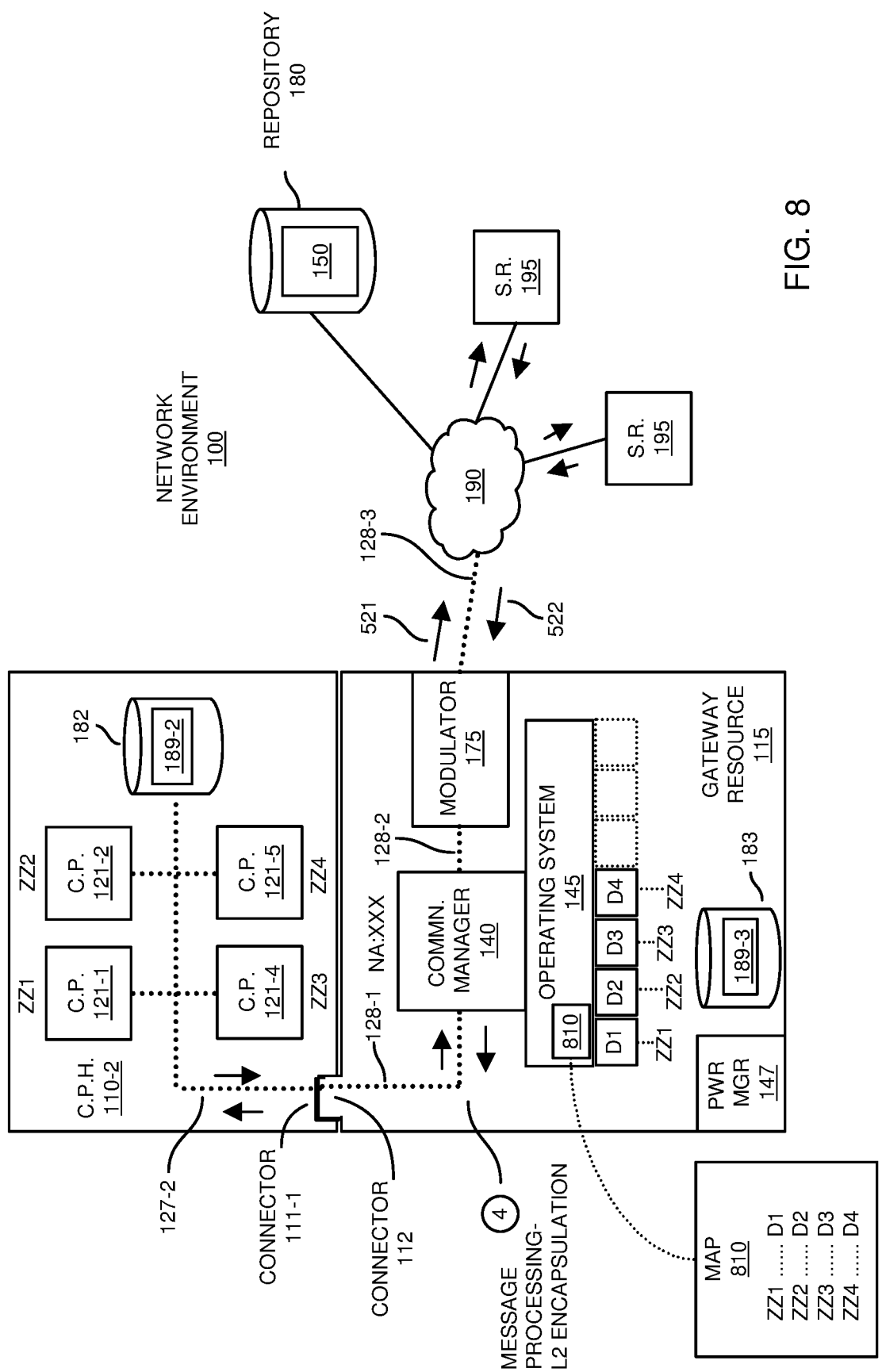
FIG. 8 is an example diagram illustrating conveyance of communications between the multiple communication ports of the newly inserted communication port hardware and destination devices in a remote network according to embodiments herein.

FIG. 8 is an example diagram illustrating conveyance of communications between the multiple communication ports and destination devices in a remote network according to embodiments herein.

In a similar manner as previously discussed, subsequent to retrieving configuration information associated with each of the detected communication ports 121, the communication manager 140 executes or instantiates the respective drivers (such as for translation of data from one form to another) to provide bi-directional connectivity of the communication ports to the network 190 and vise-versa.

Map 810 indicates the mapping of the network addresses associated with each of the communication ports and the different drivers D1, D2, D3, and D4. Accordingly, the communication manager 140 is able to identify which of the multiple drivers to use based on a respective network address in a respective received data packet.

For example, for data packets received from network 190 having a destination address of ZZ1, the communication manager 140 maps the data packets to driver D1 and processes such communications via application of driver D1 (such as providing translation) prior to forwarding such communications (via L2 encapsulation) over communication link 128-1 and communication link 127-2 to the communication port 121-1 (assigned network address ZZ1); for data packets received from network 190 having a destination address of ZZ2, the communication manager 140 maps the data packets to driver D2 and processes such communications via application of driver D2 (such as providing translation) prior to forwarding such communications (via L2 encapsulation) to the communication port 121-2 (assigned network address ZZ2); for data packets received from network 190 having a destination address of ZZ3, the communication manager 140 maps the data packets to driver D3 and processes such communications via application of driver D3 (such as providing translation) prior to forwarding such communications (via L2 encapsulation) to the communication port 121-3 (assigned network address ZZ3); and so on.

In a reverse direction, for data packets received over communication link 127-2/128-1 from communication port 121-1 having a source address of ZZ1, the communication manager 140 maps the data packets (such as source address ZZ1) to driver D1 and processes such communications via application of driver D1 prior to forwarding such communications to modulator 175 that further transmits such communications over communication link 128-3 to a corresponding destination in network 128-3; for data packets received over communication link 127-2/128-1 from communication port 121-2 having a source address of ZZ2, the communication manager 140 maps the data packets to driver D2 and processes such communications via application of driver D2 prior to forwarding such communications to modulator 175 that further transmits such communications over communication link 128-3 to a corresponding destination in network 128-3; and so on.

Figure 9:
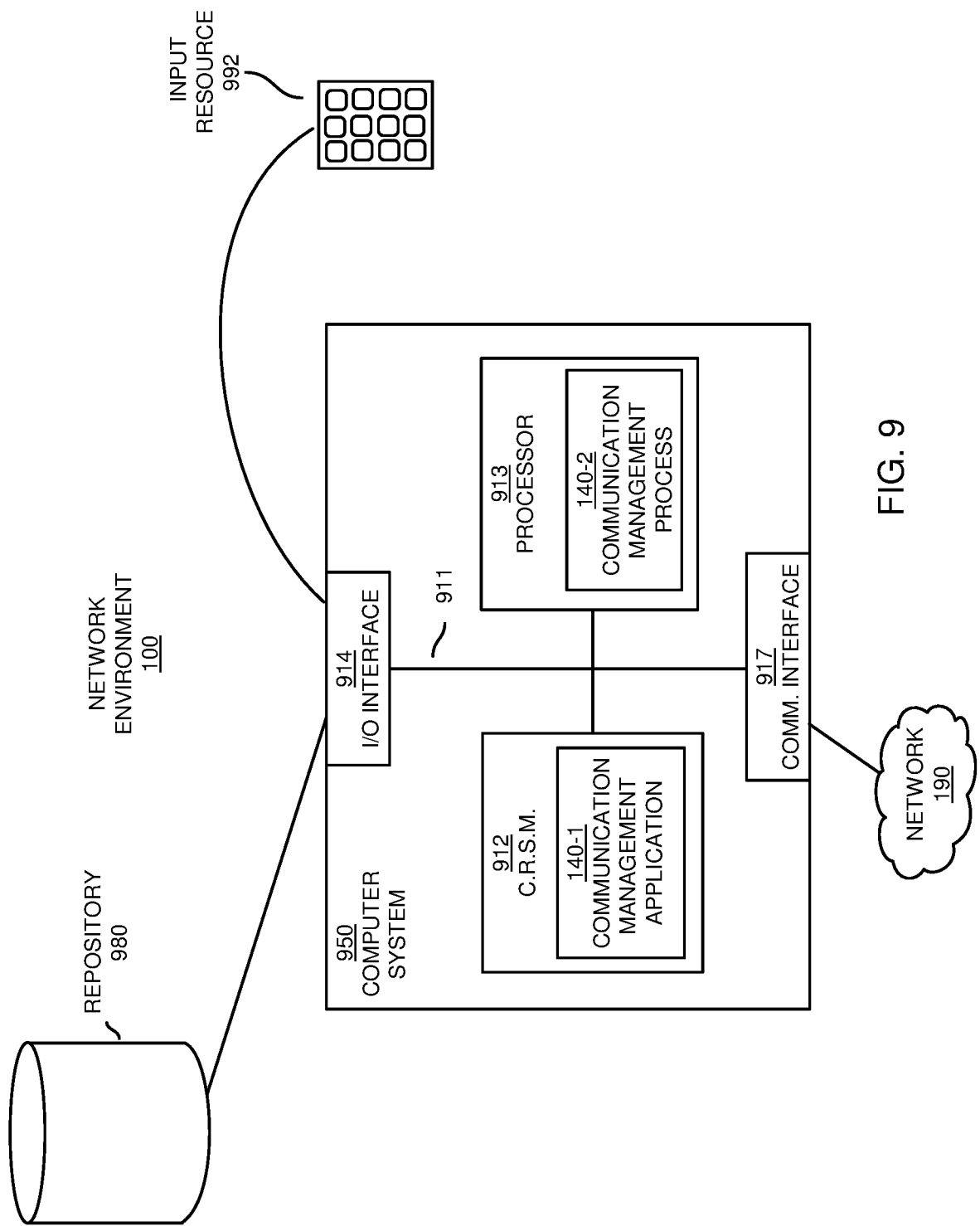
FIG. 9 is a diagram illustrating an example computer architecture to execute one or more operations according to embodiments herein.

FIG. 9 is an example block diagram of a computer system for implementing any of the operations as discussed herein according to embodiments herein.

Note that any of the resources (such as gateway resource 115, communication manager 140, communication ports, etc.) as discussed herein can be configured to include computer processor hardware and corresponding executable instructions to carry out the different operations as discussed herein.

As shown, computer system 950 of the present example can include an interconnect 911 that couples computer readable storage media 912 such as a non-transitory type of media (i.e., any type of hardware storage medium) in which digital information can be stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces playback process 140-2 to carry out any of the operations and/or processes as discussed herein.

Those skilled in the art will understand that the computer system 950 can include other processes and/or software and hardware components, such as an operating system 145 that provides functionality as described herein.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
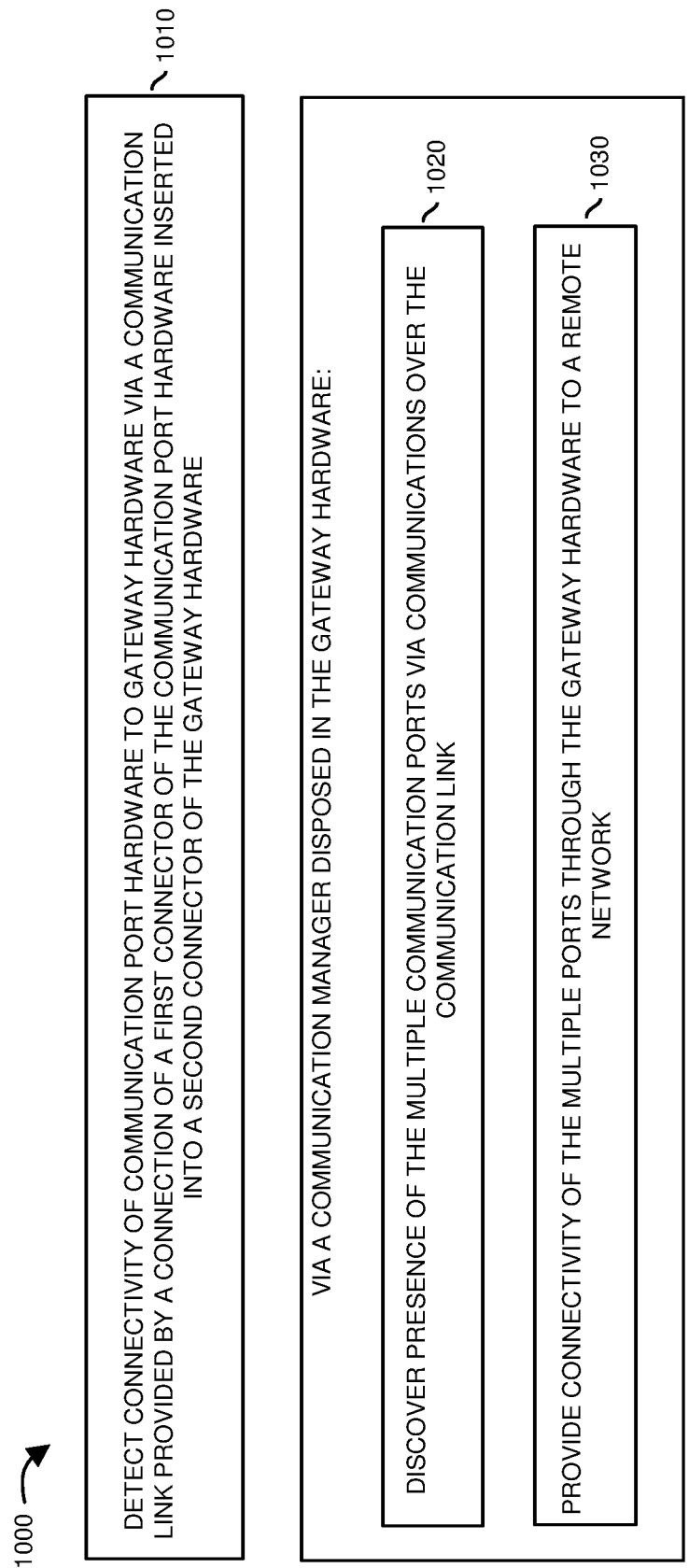
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication manager 140 detects connectivity of communication port hardware to gateway hardware 115 via a communication link (such as communication link 128-1 and communication link 127-1) provided by a connection of a first connector 111-1 of the communication port hardware 110-1 inserted into a second connector 112 of the gateway hardware 115.

In processing operation 1020, the communication manager 140 discovers presence of the multiple communication ports 120 (such as including communication port 120-1, communication port 120-2, communication port 120-3, communication port 120-4, communication port 120-5, and communication port 120-6) via communications over the communication link 128-1/127-1.

In processing operation 1030, the communication manager 140 provides connectivity of the multiple communication ports 120 through the gateway hardware 115 to a remote network 190.

Note again that techniques herein are well suited to facilitate communications via a modular communication system such as including gateway hardware and swappable communication port hardware. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A modular communication system comprising:
   communication port hardware including a first connector, the communication port hardware including multiple communication ports;
   gateway hardware including a second connector selectively matable with the first connector, coupling of the first connector and the second connector creating a communication link between the communication port hardware and the gateway hardware; and
   a communication manager disposed in the gateway hardware, the communication manager operative to discover presence of the multiple communication ports via communications through the communication link.

2. The modular communication system as in claim 1, wherein the communication manager is further operative to:
   receive messages from a remote network, the messages directed to a first communication port of the multiple communication ports; and
   encapsulate the received messages into encapsulated messages; and
   forward the encapsulated messages to the first communication port.

3. The modular communication system as in claim 2, wherein the communication manager is further operative to:
encapsulate the received communications into encapsulated communications in accordance with L2 encapsulation.

4. The modular communication system as in claim 1, wherein the multiple communication ports include a first communication port and a second communication port, the communication manager further operative to:
via first communications through the communication link with the first communication port, detect a type assigned to the first communication port;
based on the type assigned to the first communication port, identify a first driver supporting control of the first communication port; and
via execution of the first driver by the communication manager, communicate with the first communication port;
via second communications through the communication link with the second communication port, detect a type assigned to the second communication port;
based on the type assigned to the second communication port, identify a second driver supporting control of the second communication port; and
via execution of the second driver by the communication manager, communicate with the second communication port.

5. The modular communication system as in claim 1, wherein the multiple communication ports include a first communication port, the communication manager further operative to:
detect a type assigned to the first communication port;
map the type assigned to the first communication port to corresponding configuration information, the corresponding configuration information supporting conveyance of messages to the first communication port;
retrieve the corresponding configuration information; and
utilize the configuration information to communicate the messages from the communication manager to the first communication port.

6. The modular communication system as in claim 1, wherein the communication port hardware is replacement communication port hardware, the method further comprising:
in response to detecting a condition in which original communication port hardware connected to the gateway hardware via the second connector is swapped with the replacement communication port hardware, initiating discovery of the multiple communication ports of the replacement communication port hardware via the communications transmitted through the communication link.

7. The modular communication system as in claim 1, wherein the multiple communication ports include: i) a first communication port, the first communication port being a wireless transceiver supporting wireless communications, and ii) a second communication port, the second communication port supporting communications over a hard-wired cable coupled to the second communication port.

8. The modular communication system as in claim 1, wherein the communication manager is further operative to:
in response to detecting connectivity of the communication port hardware to the gateway hardware, communicate a discovery inquiry over the communication link to the multiple communication ports; and
in response to communication of the discovery inquiry, receive a respective response communication from each of the corresponding communication ports, the respective response communication including a unique identifier value assigned to the corresponding communication port.

9. The modular communication system as in claim 8, wherein the communication manager is further operative to:
based on the unique identifier value assigned to the corresponding communication port, instantiate a respective driver for the corresponding communication port; and
via the respective driver, provide connectivity of the corresponding communication port over the communication link through the gateway hardware to the remote network.

10. The modular communication system as in claim 9, wherein the communication manager is further operative to:
i) receive a data packet from the remote network, the data packet directed to the corresponding communication port;
ii) execute the respective driver, the respective driver translating the received data packet; and
iii) forward the translated data packet over the communication link to the corresponding communication port.

11. The modular communication system as in claim 1, wherein the communication manager is further operative to:
receive first messages from a remote network via a communication interface, the communication interface being independent of the first connector, the first messages directed to a first communication port of the multiple communication ports; and
forward the first messages from the communication manager over the communication link to the first communication port.

12. The modular communication system as in claim 11, wherein the communication manager is further operative to:
receive second messages from the remote network via the communication interface, the second messages directed to a second communication port of the multiple communication ports; and
forward the second messages from the communication manager over the communication link to the second communication port.

13. The modular communication system as in claim 1, wherein the multiple communication ports include a first communication port, the communication manager further operative to:
communicate over the communication link to retrieve corresponding configuration information stored in a repository of the communication port hardware, the corresponding configuration information supporting conveyance of messages from the communication manager over the communication link to the first communication port; and
via use of the configuration information, communicate the messages from the communication manager to the first communication port.

14. The modular communication system as in claim 1, wherein the communication manager is further operative to:
receive communications from a remote network, the communications directed to the multiple communication ports;
encapsulate the received communications into encapsulated communications in accordance with an encapsulation protocol; and
forward the encapsulated communications to the multiple communication ports.

15. The modular communication system as in claim 1, wherein the multiple communication ports include: i) a first communication port, the first communication port operative to provide a first communication device connectivity over a communication path extending from the first communication port over the communication link through the gateway resource to a remote network, and ii) a second communication port, the second communication port operative to provide a second communication device connectivity over the communication path extending from the second communication port over the communication link through the gateway resource to the remote network.

16. The modular communication system as in claim 1, wherein the communication manager is further operative to:
discover a first network address assigned to a first communication port of the multiple communication ports via communications from the communication manager to the communication port hardware;
execute a first driver assigned to the first network address;
receive first communications including first destination information specifying the first network address in which to forward the first communications; and
via the first destination information, forward the first communications over the communication link from the communication manager to the first communication port.

17. The modular communication system as in claim 16, wherein the communication manager is further operative to:
discover a second network address assigned to a second communication port of the multiple communication ports via the communications from the communication manager to the communication port hardware;
execute a second driver assigned to the second network address;
receive second communications including second destination information specifying the second network address in which to forward the second communications; and
via the second destination information, forward the second communications over the communication link from the communication manager to the second communication port.

18. The modular communication system as in claim 1, wherein each of the multiple communication ports supports a different data delivery protocol, the multiple communication ports including a first communication port and a second communication port; and
wherein the communication manager is further operative to:
receive a first data packet destined for delivery to the first communication port;
via a first translator assigned to the first communication port, translate the first data packet into a first translated data packet;
forward the translated first data packet from the communication manager over the communication link to the first communication port;
receive a second data packet destined for delivery to the second communication port;
via a second translator assigned to the second communication port, translate the second data packet into a second translated data packet; and
forward the translated second data packet from the communication manager over the communication link to the second communication port.

19. The modular communication system as in claim 18, wherein the communication manager is further operative to:

in response to detecting that the received first data packet includes a first network address which is assigned to the first communication port, map the first network address to the first translator for processing of the first data packet by the first translator; and
in response to detecting that the received second data packet includes a second network address which is assigned to the second communication port, map the second network address to the second translator for processing of the second data packet by the second translator.

20. The modular communication system as in claim 1, wherein the communication manager is further operative to:
execute a first translator in the gateway resource to support conveyance of first data packets between a remote network and a first communication port of the communication port hardware; and
execute a second translator in the gateway resource to support conveyance of second data packets between the remote network and a second communication port of the communication port hardware.

21. A method comprising:
detecting connectivity of communication port hardware to gateway hardware via a communication link provided by a connection of a first connector of the communication port hardware inserted into a second connector of the gateway hardware;
via a communication manager disposed in the gateway hardware:
i) discovering presence of the multiple communication ports via communications over the communication link; and
ii) providing connectivity of the multiple ports through the gateway hardware to a remote network.

22. The method as in claim 21, wherein providing connectivity of the multiple ports through the gateway hardware to the remote network includes:
receiving communications from the remote network, the communications directed to a first communication port of the multiple communication ports; and
encapsulating the received communications into encapsulated communications; and
forwarding the encapsulated communications to the first communication port.

23. The method as in claim 22, wherein encapsulating the received communications into encapsulated communications includes:
encapsulating the received communications into encapsulated communications in accordance with L2 encapsulation.

24. The method as in claim 21, wherein the multiple communication ports include a first communication port and a second communication port, the method further comprising:
via first communications through the communication link with the first communication port, detecting a type assigned to the first communication port;
based on the type assigned to the first communication port, identifying a first driver; and
via execution of the first driver by the communication manager, communicating with the first communication port;
via second communications through the communication link with the second communication port, detecting a type assigned to the second communication port;
based on the type assigned to the second communication port, identifying a second driver; and via execution of the second driver by the communication manager, communicating with the second communication port.

25. The method as in claim 21, wherein the multiple communication ports include a first communication port, the method further comprising:
    detecting a type assigned to the first communication port;
    mapping the type assigned to the first communication port to corresponding configuration information, the corresponding configuration information supporting operation of the first communication port;
    retrieving the corresponding configuration information; and
    utilizing the configuration information to communicate between the communication manager and the first communication port.

26. The method as in claim 21, the communication port hardware is replacement communication port hardware, the method further comprising:
    in response to detecting a condition in which original communication port hardware connected to the gateway hardware is swapped with the replacement communication port hardware, initiating discovery of the multiple communication ports on the replacement communication port hardware via communications through the communication link.

27. The method as in claim 21, wherein the multiple communication ports include: i) a first communication port, the first communication port being a wireless transceiver supporting wireless communications, and ii) a second communication port, the second communication port supporting communications over a hard-wired cable.

28. The method as in claim 21, wherein discovering presence of the multiple communication ports via communications over the communication link includes:
    in response to detecting initial connectivity of the communication port hardware into the gateway hardware, communicating a discovery inquiry over the communication link to the multiple communication ports; and
    in response to communication of the discovery inquiry, receiving a respective response communication from each of the corresponding communication ports, the respective response communication including a unique identifier value assigned to the corresponding communication port.

29. The method as in claim 28, wherein providing connectivity of the multiple ports through the gateway hardware to the remote network includes:
    based on the unique identifier value assigned to the corresponding communication port, instantiating a respective driver for the corresponding communication port; and
    via the respective driver, providing connectivity of the corresponding communication port over the communication link through the gateway hardware to the remote network.

30. The method as in claim 29, wherein providing the connectivity of the corresponding communication port to the remote network includes:
    at the communication manager:
        i) receiving a communication from the remote network, the communication directed to the corresponding communication port;
        ii) executing the respective driver to translate the received communication; and
        iii) forwarding the translated communication over the communication link to the corresponding communication port.

31. Computer-readable storage hardware having instructions stored thereon, the instructions, when carried out by computer processor hardware, cause the computer processor hardware to:
    detect connectivity of communication port hardware to gateway hardware via a communication link provided by a connection of a first connector of the communication port hardware inserted into a second connector of the gateway hardware; and
    via a communication manager disposed in the gateway hardware:
        i) discover presence of the multiple communication ports via communications over the communication link; and
        ii) provide connectivity of the multiple ports through the gateway hardware to a remote network.

* * * * *